United States Patent
Yang et al.

(10) Patent No.: US 11,659,443 B2
(45) Date of Patent: May 23, 2023

(54) METHOD, DEVICE, APPARATUS AND STORAGE MEDIUM FOR COMMUNICATION IN COMMUNICATION NETWORK

(71) Applicant: Nokia Solutions and Networks Oy, Espoo (FI)

(72) Inventors: Zhijie Yang, Shanghai (CN); Haiqin Wu, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 147 days.

(21) Appl. No.: 17/355,439

(22) Filed: Jun. 23, 2021

(65) Prior Publication Data

US 2022/0053376 A1 Feb. 17, 2022

(30) Foreign Application Priority Data

Aug. 14, 2020 (CN) .......................... 202010818357.6

(51) Int. Cl.
*H04W 28/08* (2023.01)
*H04W 8/24* (2009.01)

(52) U.S. Cl.
CPC ......... *H04W 28/0967* (2020.05); *H04W 8/24* (2013.01); *H04W 28/0819* (2020.05); *H04W 28/0838* (2020.05); *H04W 28/0883* (2020.05)

(58) Field of Classification Search
CPC .............. H04W 28/0967; H04W 8/24; H04W 28/0819; H04W 28/0838; H04W 28/0883;
(Continued)

(56) References Cited

U.S. PATENT DOCUMENTS

| 9,730,151 | B2 * | 8/2017 | Jia .......................... H04L 1/1607 |
| 9,800,389 | B2 * | 10/2017 | Abraham .............. H04W 48/16 |
| 10,356,670 | B2 * | 7/2019 | Craig ................ H04W 36/0038 |

FOREIGN PATENT DOCUMENTS

| EP | 2364049 B1 * | 6/2012 | ............ H04W 48/16 |
| EP | 3799455 A4 * | 3/2022 | ........ H04W 36/0016 |

(Continued)

OTHER PUBLICATIONS

Bhartia Apurv Apurv@Meraki Com et al:, "Client Marshal Regaining Control from Wireless Clients for Better Experience", Mobile Computing and Networking, ACM, 2 Penn Plaza, Suite 701 New York NY 10121-0701 USA, Aug. 5, 2019 (Aug. 5, 2019), pp. 1-16, XP058475446.

(Continued)

*Primary Examiner* — Ahmed Elallam
(74) *Attorney, Agent, or Firm* — Harness, Dickey & Pierce, P.L.C.

(57) ABSTRACT

A first device in a communication network receives from at least one second device in the communication network, a first request for acquiring a token, the token being permission for communicating with a third device. Based on the first request, a device from the at least one second device and the first device as a communication device is selected for providing a communication service to the third device in the communication network; and the token is transmitted to the communication device. The communication device receives the token for communicating with the third device. Other devices receive key information associated with communication of the third device from the first device, and monitor data associated with the communication of the third device.

10 Claims, 5 Drawing Sheets

(58) Field of Classification Search
CPC ......... H04W 28/0875; H04W 12/0431; H04W 48/16; H04W 12/73; H04W 12/065; H04W 28/08; H04W 48/08
See application file for complete search history.

(56) References Cited

FOREIGN PATENT DOCUMENTS

| | | |
|---|---|---|
| WO | WO-2019/168764 | 9/2019 |
| WO | WO-2019/223679 | 11/2019 |

OTHER PUBLICATIONS

Zubow Anatolij et al:, "BIGAP—Seamless handover in high performance enterprise IEEE 802.11 networks," NOMS 2016—2016 IEEE/IFIP Network Operations and Management Symposium, IEEE, Apr. 25, 2016 (Apr. 25, 2016), pp. 445-453, XP032918134.
Jay Yang (Nokia):, "virtual BSS for multi ap coordination," IEEE Draft; 11-20-1247-00-00BE-VIRTUAL-BSS-FOR-MOLTI-AP-Coordination, IEEE-SA Mentor, Piscataway, NJ USA, vol. 802.11 EHT; 802.1lbe Aug. 19, 2020 (Aug. 19, 2020), pp. 1-12, XP068170602.
Search Report for European Application No. 21183427.0 dated Mar. 31, 2022.

\* cited by examiner

METHOD, DEVICE, APPARATUS AND STORAGE MEDIUM FOR COMMUNICATION IN COMMUNICATION NETWORK

CROSS-REFERENCE TO RELATED APPLICATIONS

The present application claims priority under 35 U.S.C. § 119 to Chinese Patent Application No. 202010818357.6, filed on Aug. 14, 2020, in the Chinese Patent Office, the entire contents of which are hereby incorporated by reference.

FIELD

Embodiments of the present disclosure generally relate to the communication field, and more specifically, to a method, apparatus, device and computer readable storage medium for communication in a communication network.

BACKGROUND

A communication network, such as an Extended Service Set (ESS) network, a Mesh Basic Service Set (MBSS) network, and the like, is comprised of a plurality of Access Point (AP) devices (also referred to as nodes). Traditionally, a terminal device in a moving state can scan different AP nodes and dynamically select an AP node having a better Received Signal Strength Indicator (RSSI) value, so as to roam to the selected AP node. If a certain AP node has a too large of a load or receives a weak signal of a packet from the terminal device, the AP node will recommend a further candidate AP node to the terminal device to enable the latter to establish a connection with the further candidate AP node, and thus achieve load balance.

Nonetheless, in the case of roaming or load balance, the terminal device can acquire an Internet service via a new AP node only after completing an authentication connection with the new AP node. In the application scenarios featuring large data volume and ultra-low latency, such as Augmented Reality (AR) and Virtual Reality (VR), delay-caused instant stick may occur during the roaming process and a good customer experience cannot be provided. Further, renegotiation of the key involved in the process of connecting with a new AP node when attacked by a sniffer, which can cause leakage of the key in the process, and user data can be stolen and monitored.

SUMMARY

In general, embodiments of the present disclosure provide an improved mechanism for communication in a communication network.

In a first aspect of the present disclosure, there is provided a first device in a communication network. The first device comprises: a processor; and a memory coupled to the processor and having instructions stored therein, the instructions when executed by the processor causing the first device to: receive, from at least one second device in the communication network, a first request for acquiring a token, the token being permission for communication with a third device, the first device and the at least one second device having the same Service Set Identifier (SSID), Basic Service Set Identifier (BSSID), and Associated Identifier (AID) during the communication with the third device; select, based on the first request, a device from the at least one second device and the first device as a communication device for providing a communication service to the third device in the communication network; and transmit the token to the communication device for use in the communication with the third device via the communication device.

In a second aspect of embodiments of the present disclosure, there is provided a second device in a communication network. The second device comprises: a processor; and a memory coupled to the processor and having instructions stored therein, the indications when executed by the processor causing the second device to: in response to receiving a probe request from a third device, transmit a first request for acquiring a token to a first device in the communication network, the token being permission for communication with the third device, the first device and the at least one second device having the same SSID, BSSID, and AID during communication with the third device; and receive the token from the first device for use in the communication with the third device.

In a third aspect of embodiments of the present disclosure, there is provided a second device in a communication network. The second device comprises: a processor; and a memory coupled to the processor and having instructions stored therein, the instructions when executed by the processor causing the second device to: receive, from a first device in the communication network, key information associated with communication of a third device, the first device and the at least one second device having the same SSID, BSSID, and AID during communication with the third device; and monitor, based on the key information, data associated with the communication of the third device.

In a fourth aspect of embodiments of the present disclosure, there is provided a third device. The third device comprises: a processor; and a memory coupled to the processor and having instructions stored therein, the instructions when executed by the processor causing the third device to: transmit a probe request to each of a first device and at least one second device in a communication network, each of the first device and the at least one second device having the same SSID, BSSID, and AID during communication with the third device; receive a response to the probe request from a device among the first device and the at least one second device; and perform communication via the device.

In a fifth aspect of embodiments of the present disclosure, there is provided a method for communication. The method comprises: receiving, at a first device in a communication network and from at least one second device in the communication network, a first request for acquiring a token, the token being permission for communication with a third device, the first device and the at least one second device having the same SSID, BSSID, and AID during communication with the third device; selecting, based on the first request, a device from the at least one second device and the first device as a communication device for providing a communication service to the third device in the communication network; and transmitting the token to the communication device for use in the communication with the third device via the communication device.

In a sixth aspect of embodiments of the present disclosure, there is provided a method for communication. The method comprises: in response to receiving a probe request from a third device, transmitting, at a second device in a communication network and from a first device in the communication network, a first request for acquiring a token, the token being permission for communication with the third device, the first device and the at least one device having the same SSID, BSSID, and AID during communication with the third device; and receiving the token from the first device for use in the communication with the third device.

In a seventh aspect of embodiments of the present disclosure, there is provided a method for communication. The method comprises: receiving, at a second device in a communication network and from a first device in the communication network, key information associated with communication of a third device, the first device and the at least one second device having the same SSID, BSSID, and AID during communication with the third device; and monitoring, based on the key information, data associated with the communication of the third device.

In an eighth aspect of embodiments of the present disclosure, there is provided a method for communication. The method comprises: transmitting, at a third device, a probe request to each of a first device and at least one second device in a communication network, each of the first device and the at least one second device having the same SSID, BSSID, and AID during communication with the third device; receiving a response to the probe request from a device among the first device and the at least one second device; and performing communication via the device.

In a ninth aspect of embodiments of the present disclosure, there is provided an apparatus for communication. The apparatus comprises: means for receiving, at a first device in a communication network and from at least one second device in the communication network, a first request for acquiring a token, the token being permission for communication with a third device, the first device and the at least one second device having the same SSID, BSSID, and AID during the communication with the third device; means for selecting, based on the first request, a device from the at least one second device and the first device as a communication device for providing a communication service to the third device in the communication network; and means for transmitting the token to the communication device for use in the communication with the third device via the communication device.

In a tenth aspect of embodiments of the present disclosure, there is provided an apparatus for communication. The apparatus comprises: means for transmitting, at a second device in a communication network, a first request for acquiring a token to a first device in the communication network in response to receiving a probe request from a third device, the token being permission for communication with the third device, the first device and the at least one second device having the same SSID, BSSID, and AID during communication with the third device; and means for receiving the token from the first device for use in the communication with the third device.

In an eleventh aspect of embodiments of the present disclosure, there is provided an apparatus for communication. The apparatus comprises: means for receiving, at a second device in a communication network and from a first device in the communication network, key information associated with communication of a third device, the first device and the at least one second device having the same SSID, BSSID, and AID during communication with the third device; and means for monitoring, based on the key information, data associated with the communication of the third device.

In a twelfth aspect of embodiments of the present disclosure, there is provided an apparatus for communication. The apparatus comprises: means for transmitting a probe request to each of a first device and at least one second device in a communication network, each of the first device and the at least one second device having the same SSID, BSSID, and AID during communication with the third device; means for receiving a response to the probe request from a device among the first device and the at least one second device; and means for performing communication via the device.

In a thirteenth aspect of embodiments of the present disclosure, there is provided a computer readable storage medium. The computer readable storage medium comprises machine executable instructions when executed by a device causing the device to perform the method according to the fifth aspect of embodiments of the present disclosure.

In a fourteenth aspect of embodiments of the present disclosure, there is provided a computer readable storage medium. The computer readable storage medium comprises machine executable instructions when executed by a device causing the device to perform the method according to the sixth aspect of embodiments of the present disclosure.

In a fifteenth aspect of embodiments of the present disclosure, there is provided a computer readable storage medium. The computer readable storage medium comprises machine executable instructions when executed by a device causing the device to perform the method according to the seventh aspect of embodiments of the present disclosure.

In a sixteenth aspect of embodiments of the present disclosure, there is provided a computer readable storage medium. The computer readable storage medium comprises machine executable instructions when executed by a device causing the device to perform the method according to the eighth aspect of embodiments of the present disclosure.

In the solution according to embodiments of the present disclosure, a new communication mechanism in a communication network is introduced, which enables a plurality of nodes in the communication network to face a terminal device using the same identification information. That is, from the perspective of the terminal device, the plurality of nodes can be viewed as a node. In this way, by adjusting load balance of the first or second device and timely capturing a movement path of the third device, an optimal communication device is dynamically selected for the third device such that latency of the terminal device can be reduced significantly. Moreover, the reconnection process of the terminal device among a plurality of nodes can be significantly simplified while guaranteeing communication security of the terminal device.

It should be appreciated that this Summary is not intended to identify key features or essential features of the present disclosure, nor is it intended to be used to limit the scope of the present disclosure. Other features in the present disclosure will be made clear through the description below.

BRIEF DESCRIPTION OF THE DRAWINGS

Through the following detailed description with reference to the accompanying drawings, the above and other objectives, features, and advantages of the present disclosure will become more apparent. Throughout the drawings, the same or similar reference symbols refer to the same or similar components.

DETAILED DESCRIPTION OF EMBODIMENTS

Embodiments of the present disclosure will now be described in detail with reference to the accompanying drawings. Although the drawings illustrate some embodiments of the present disclosure, it should be appreciated that the present disclosure may be implemented in various manners and should not be construed as being limited by those embodiments illustrated herein. Rather, these embodiments are provided to disclose the present disclosure more thoroughly and completely. It is also to be understood that the drawings and embodiments are provided only as examples, without suggesting any limitation to the scope disclosed herein.

As used herein, the term "includes" and its variants are to be read as open-ended terms that mean "includes, but is not limited to." The term "based on" is to be read as "based at least in part on." The term "an embodiment" is to be read as "at least one example embodiment;" and the term "another embodiment" is to be read as "at least one further embodiment." Relevant definitions of other terms will be given in the following description.

It should be noted that, although the terms "first," "second," and the like are employed here to describe various components, those components should not be limited by such terms which are used only for convenience of distinguishing one component from another. For example, a first component may also be called second component, or vice versa, without departing from the scope disclosed therein. As used herein, "and/or" covers any or all combinations of one or more terms listed before and after it.

As used herein, the term "circuitry" refers to one or more of the following:

(a) a hardware-only circuitry implementation (e.g., an implementation where only analog and/or digital circuitry is provided);

(b) a combination of hardware circuitry and software, for example, (if applicable): (1) a combination of analog and/or digital circuitry and software/firmware, and (ii) any part of a hardware processor and software (including: a digital signal processor, software, and memory operating together to enable devices, such as an Optical Line Terminal (OLT) or other computing device, to implement various functions); and (c) hardware circuitry and/or a processor, such as a microprocessor or a part thereof, where software (e.g., firmware) is provided for operation but may be missing if not required.

The above definition of circuitry is applicable to all the application scenes described herein (including the claims). In another example, the term "circuitry" also includes an implementation of hardware circuitry or processor (or multiple processors) only, or a part of hardware circuitry or a processor, or software or firmware attached thereto. For example, if used in a particular claim, the term "circuitry" further covers a baseband integrated circuit, processor circuit, OLT, or other similar integrated circuit in other computing devices.

As used therein, the term "communication network" refers to a network that complies with any appropriate communication standard, such as LTE, LTE-Advanced (LTE-A), Wideband Code Division Multiple Access (WCDMA), High Speed Packet Access (HSPA), Narrowband Internet of Things (NB-IoT), and the like. In addition, communication between a terminal device and a network device in a communication network may be performed according to any appropriate generation of communication protocol, including, but not limited to, the first generation (1G), the second generation (2G), 2.5G, 2.75G, the third generation (3G), the fourth generation (4G), 4.5G, and the future fifth generation (5G) communication protocol, and/or the first generation (WIF1), the second generation (WIFI2), the third generation (WIFI3), the fourth generation (WIFI4), the fifth generation (WIFI5), the sixth generation (WIFI6), and the future seventh generation (WIFI7) local area network communication protocol, and/or any other protocol currently known or to be developed in the future. The embodiments of the present disclosure are applicable to various communication systems. Considering the rapid development of the communication technology, there is a possibility of combining the present invention with some future communication technologies and systems. It should be appreciated that the scope of the present disclosure is not limited to the above system.

As used herein, the term "network device" refers to a node in a communication network, via which a terminal device can access the network and receive a service from the latter. Depending on the application terms and technologies, a network device may refer to a Base Station (BS) or Access Point (AP), for example, a Node B (NodeB or NB), Evolved Node B (eNodeB or eNB), NR NB (also called gNB), Remote Radio Unit (RRU), Radio Head (RH), Remote Radio Head (RRH), relay, a low power node such as a pico base station or femto base station, and the like.

The term "terminal device" refers to any terminal device applicable in radio communication. For example, without limitation, the terminal device may be also called communication device, User Equipment (UE), User Station (SS), portable user station, Mobile Station (MS) or Access Terminal (AT). The terminal device may include, but is not limited to, a mobile phone, smart phone, Voice over Internet Protocol (VoIP) phone, wireless local loop phone, tablet computer, wearable terminal device, Personal Digital Assistant (PDA), portable computer, desktop computer, image acquisition terminal device such as digital camera, game terminal device, music storage and playback device, vehicle-mounted wireless terminal device, wireless endpoint, mobile station, Laptop Embedded Equipment (LEE), Laptop Mounted Equipment (LME), USB dongle, smart device, wireless Customer Premises Equipment (CPE), Internet of Things (LOT) device, watch or other wearable device, Head Mounted Display (HMD), vehicle, drone, medical device and application program (e.g., for remote surgery), industrial device and application program (e.g., robot and/or other wireless device in an industrial context and/or automated processing chain context), consumer electronic device, device running in a commercial and/or industrial wireless network, and the like. In the description below, the terms "terminal device," "communication device," "terminal," "user equipment" and "UE" can be used interchangeably.

As used herein, the term "communication network" may refer to a home network, corporate network or other similar local network communicating in a wireless manner, such as WiFi, Bluetooth, and the like. The communication network may also refer to any wired or wireless communication network capable of implementing embodiments of the present disclosure. In some embodiments, the communication network may be one of MBSS and ESS. Considering the rapid development of the communication technology, there is a possibility of combining the present invention with a future communication technology and network. Therefore, the scope disclosed herein should not be considered as being restricted to the network as described above.

In the legacy MBSS and ESS network, each AP node has the same SSID but a different BSSID in communication (i.e., fronthaul) with a terminal device. In the circumstance, in the case of roaming or load balance, the terminal device can acquire an Internet service via a new AP only after completing an authentication connection with the new AP node. In scenarios featuring large data volume and ultra-low latency, such as AR and VR, delay-caused instant stick may occur during the roaming process and a good customer experience cannot be provided. Moreover, renegotiation of the key involved in the process of connecting with a new AP node when attacked by a sniffer, which may cause leakage of the key in the process, and user data can be stolen and monitored.

In the legacy solution, as to the delay during roaming, fast roaming as defined in the 802.11r standard is brought up. In this way, the delay can be reduced to 50 ms, but it still cannot meet the requirements of AR/VR for ultra-low delay. In addition, normal function can be achieved only if the 802.11r standard is supported by both the AP node and the terminal device. For those terminal devices not supporting the 802.11r standard, they have to follow the steps of re-association, four-way handshake and IP address application. However, the delay still exists.

Furthermore, in the legacy solution, as to the sniffing attack risk contained in the process of key negotiation, 802.1X standard and the Wi-Fi Protected Access 3 (WPA3) protocol have offered safer key negotiation mechanisms. However, these mechanisms require the support of the 802.1X standard or the WPA3 protocol by both the AP node and the terminal device. Nevertheless, most terminal devices currently on the market, especially Internet of Things (IoT) devices, support neither the 802.1X standard nor the WPA3 protocol. Furthermore, the mechanism proposed according to the 802.1X standard leads to a longer delay.

In view of the above, embodiments of the present disclosure provide a new communication mechanism in a communication network. In the mechanism, a plurality of AP nodes in the communication network face a terminal device using the same identification information. That is, from the perspective of the terminal device, the plurality of AP nodes can be viewed as a node. Owing to the same identification information involved in communication with a terminal device, the plurality of AP nodes can be switched seamlessly without impacting communication of the terminal device. In other words, collaboration among the plurality of AP nodes enables a safe and seamless connection of the terminal device to any AP node, without the necessity of re-establishing the connection. As such, the security of communication of a terminal device can be improved. Moreover, by adjusting load balance of a first or second device and timely capturing a movement path of a third device, an optimal communication device can be selected for the third device, which remarkably reduces the service delay of the terminal device. Besides, a good compatibility with most terminal devices can also be attained.

Figure 1:
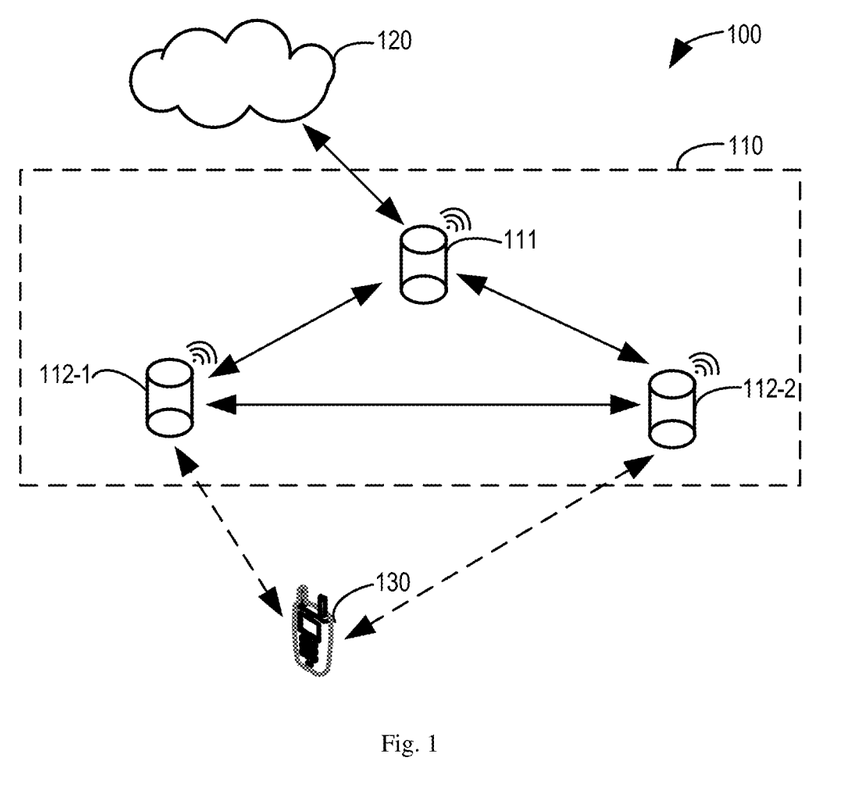
FIG. 1 is a schematic diagram of an example communication system where embodiments of the present disclosure can be implemented.

FIG. 1 is a schematic diagram of an example communication system 100 where embodiments of the present disclosure can be implemented. As shown, the system 100 may include a communication network 110, the Internet 120, and a device 130 (for clarity, hereinafter also referred to as third device 130). The third device 130 may be connected via the communication network 110 to the Internet 120 for data access. In some embodiments, the third device 130 may be a terminal device. However, embodiments of the present disclosure are not limited thereto, and the third device may be of other types.

The communication device 110 may include a first device 111 and second devices 112-1 and 112-2 (for clarity, hereinafter collectively referred to as at least one second device 112). The first device 111 acts as a root node in the communication network 110, and the second device 112 is an extended node in the communication network 110. In some embodiments, the first device 111 and the second device 112 may by a router, respectively. However, embodiments of the present disclosure are not limited thereto, and the first device and the second device may also be of other types. In addition, the number of the second devices is not limited to the specific figure as shown, and there may be more or fewer second devices.

The third device 130 may be in communication with any AP node (e.g., the first device 111 or the second device 112) in the communication network 110 via a wireless link. Nodes in the communication network 110 may communicate with each other by backhaul of the wireless link or Ethernet link. The first device 111 in the communication network 110 may be connected via a Wide Area Network (WAN) port to the Internet 120. It should be appreciated that the number of the communication networks 110 or the third device 130 is not limited to the example as shown in FIG. 1, and may be a larger one. Further, instead of being configured to the specific example as described above, they may be implemented in any appropriate manner.

In the embodiment of the present disclosure, the first device 111 and the second device 112 in the communication network 110 have the same identification information during communication (i.e., fronthaul) with the third device 130. Thus, the first device 111 and the second device 112 can be viewed by the third device 130 as the same node. In some embodiments, the first device 111 and the second device 112 have the same SSID, BSSID and AID. In some embodiments, the first device 111 and the second device 112 also have the same Basic Service Set color (BSS color). In some embodiments, the first device 111 and the second device 112 also have the same timestamp. For example, the first device 111 and the second device 112 have the same beacon frame timestamp. The embodiments of the present disclosure are not limited to those specific examples, and any other implementations are also feasible.

In the embodiment of the present disclosure, after the third device 130 has connected or reconnected to the communication network 110, all the AP nodes (e.g., the first device 111 and the second device 112) in the communication network 110 may acquire and update key information associated with communication of the third device 130.

In the embodiment of the present disclosure, the communication network 110 includes only one token for communication with the third device 130. In some embodiments, only the AP node with the token may be in normal communication with the third device 130, while the remaining AP nodes without the token may receive data transmitted from the third device 130 but not reply to the third device 130 with an acknowledgement message (ACK) or a unicast message (except Null Data Packet (NDP) or Null Data Packet Announcement (NDPA) message).

Figure 2:
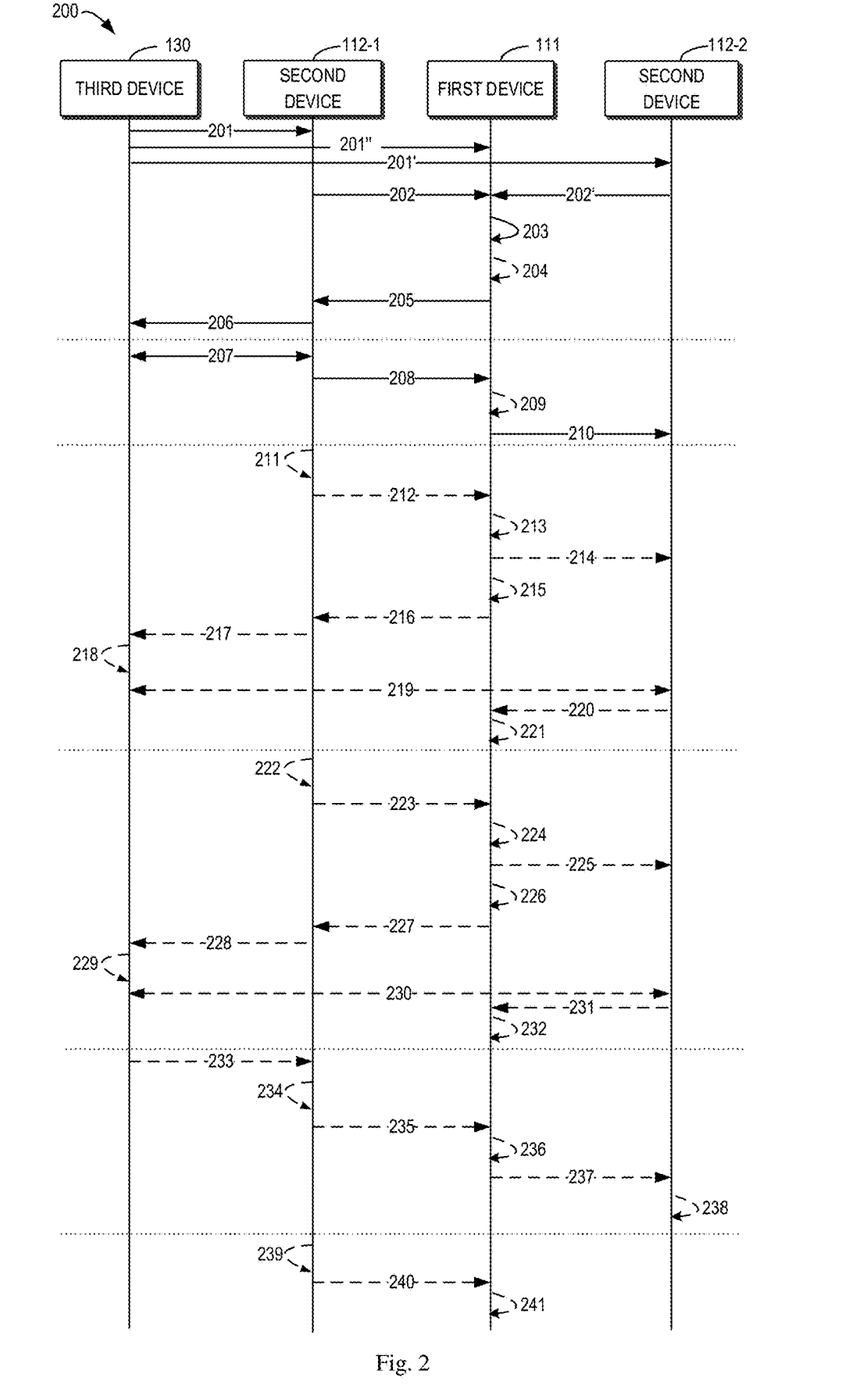
FIG. 2 is a schematic diagram of an example interaction between devices in a communication process according to an embodiment of the present disclosure.

According to embodiments of the present disclosure, collaboration between the plurality of AP nodes, such as the first device 111 and the second device 112, in the communication network 110 may enable a safe and seamless connection of the third device 130 to any AP node and then achieve data access to the Internet 120. Hereinafter, reference will be made to FIGS. 2-6 for more detail. FIG. 2 is a schematic diagram 200 of an example interaction between devices in a communication process according to an embodiment of the present disclosure. For convenience, the following description will be made with reference to the example of FIG. 1.

Operation of Scanning AP Node

As shown in FIG. 2, for example, upon turning on Wi-Fi, the third device 130 may transmit a probe request. In some embodiments, the third device 130 may send out a probe request frame. Of course, this is merely an example, and the probe request may be provided in other forms. Correspondingly, the second device 112-1 in the communication network 110 may receive 201 the probe request, and the second device 112-2 may also receive 201' the probe request. In addition, the first device 111 in the communication network 110 may receive 201" the probe request as well.

In response to receiving the probe request, the second device 112-1 transmits 202 a request for acquiring the token (for clarity, hereinafter also referred to as first request) to the first device 111, and the second device 112-1 also transmits 202' a request for acquiring the token (for clarity, hereinafter also referred to as first request) to the first device 111. The token is permission for communication with the third device 130. For example, each second device 112 that has received the probe request from the third device 130 may request, from the first device 111, the token for communication with the third device 130. In some embodiments, the first device 111 per se may generate the request for the token.

Upon receiving the first requests from the second devices 112-1 and 112-2, the first device 111 selects 203 one device from the second devices 112-1 and 112-2 and the first device 111 as a communication device for providing a communication service to the third device 130. In some embodiments, the first device 111 may determine whether the first device 111 stores information of the communication device. If it is determined that the information of the communication device is stored therein, the communication device may be determined from the information. In some embodiments, the first device 111 may locally store a table for recording dispense, registration, transfer and recycling of the token, for example, as shown in Table 1 below.

TABLE 1

Example of Token related information

| Device identifier | Information on node with token | Key information | Token expiring time |
| --- | --- | --- | --- |

It should be appreciated that the token related information in Table 1 is provided merely as an example, and any other appropriate information may also be stored therein. Moreover, the form of Table 1 is also provided exemplarily, and any other appropriate data structure may be employed.

In the example where the table is stored, the first device 111 may determine, based on the table, whether the first device 111 stores information of a communication device associated with the third device 130. If the table contains the information of the communication device associated with the third device 130, the communication device may be determined from the information accordingly.

If the information of the communication device is not stored at the first device 111 (e.g., if the table does not contain information associated with the third device 130), the first device 111 may select the communication device based on a predetermined strategy. In some embodiments, the first device 111 may select, based on a value of a Received Signal Strength Indicator (RSSI), a device from the second devices 112-1 and 112-2 and the first device 111 as the communication device. For example, the first device 111 may compute and provide RSSI values for the third device based on the second devices 112-1 and 112-2 and the first device 111 per se, and then determine a device having a greater RSSI value as the communication device for providing a communication service to the third device 130. In another example, the first device 111 may compute and provide RSSI values for the third device based on the second devices 112-1 and 112-2 and the first device 111, and then determine at least one device having a RSSI value greater than a predetermined threshold, and randomly select one device from the at least one device as the communication device. However, those embodiments are provided merely as an example, and any other appropriate manner is also feasible.

In some alternative embodiments, the first device 111 may select, based on a load balance strategy, one device from the second devices 112-1 and 112-2 and the first device 111 as the communication device. For example, the first device 111 may determine respective loads of the second devices 112-1 and 112-2 and the first device 111, and then determine the second device having a smaller load as the communication device for providing a communication service to the third device 130. In another example, the first device 111 may determine respective loads of the second devices 112-1 and 112-2 and the first device 111, then determine at least one device having a load lower than a predetermined load, and randomly select one device from the at least one device as the communication device. However, those embodiments are provided merely as an example, and any other appropriate manner is also feasible. It should be appreciated that such selection may also be performed based on a combination of multiple strategies.

In some embodiments where the information of the communication device associated with the third device is not stored, upon selection of the communication device, the first device 111 may store 204 information of the communication device in association with the third device 130. In an example, assuming that the second device 112-1 is determined as the communication device, the first device 111 may update Table 1 as follows. In this way, the token related information (also referred to as communication information) stored at the first device 111 may be updated continuously, which can improve subsequent communication efficiency and reduce the delay.

TABLE 1

Example of token related information

| Device identifier | Information on node with token | Key information | Token expiring time |
| --- | --- | --- | --- |

TABLE 1-continued

Example of token related information

| MAC address of third device 130 | Identifier of second device 120 | NO | X seconds |
|---|---|---|---|

Thereafter, the first device 111 may transmit 205 the token for communication with the third device 130 to the second device 112-1 as the communication device. For example, the first device 110 may transmit, to the second device 112-1, a specific message indicating dispense of the token. Other manners may also be employed to indicate the dispense of the token.

Upon receiving the token, the second device 112-1 transmits 206 a response to the probe request to the third device 130. For example, the second device 112-1 may transmit a probe response frame to the third device 130. In this way, the third device 130 can be enabled to detect the communication network 110.

In some alternative embodiments, for the third device detecting the communication network 110 via a beacon frame, the token dispensing may be postponed to an authentication process of the third device 130. For example, the third device 130 may receive a beacon frame from the first device 111 or the second device 112 (e.g., by regular broadcasts) and then detect the communication network 110. Next, the third device 130 may send an authentication request, such as an authentication request frame, to the communication network 110. In response to the authentication request, the communication network 110 may dispense the token to the first device 111 or second device 112. The first device 111 or second device 112 with the token may reply to the third device 130 with an acknowledge frame for acknowledging reception of the request, and transmit an authentication response frame directed to the authentication request.

Operation of Accessing to Communication Network

Upon receipt of the response from the second device 112-1, the third device 130 may complete 207 operations of authentication and four-way handshake with the second device 112-1, and thus acquire an Internet Protocol (IP) address from the first device 111.

In some embodiments, the second device 112-1 may transmit 208 key information associated with communication of the third device 130 to the first device 111. In some embodiments, the key information may include a Paired Temporal Key (PTK). In some embodiments, the key information may also include at least one group key of the following: a Group Temporal Key (GTK), or an Integrity Group Temporal Key (IGTK). Other forms of key are also feasible, and the present application does not limit this.

In some embodiments, upon receipt of the key information, the first device 110 may store 209 the key information in association with the third device 130. For example, Table 1 may be updated as follows. Of course, storage may be performed in other manners as well.

TABLE 1

Example of token related information

| Device identifier | Information on node with token | Key information | Token expiring time |
|---|---|---|---|

TABLE 1-continued

Example of token related information

| MAC address of third device 130 | Identifier of second device 112-1 | GTK data PTK data | X seconds |
|---|---|---|---|

In some embodiments, the first device 111 may dispense 210 the key information to other devices than the communication device (e.g., the second device 112-2 and the first device 111) among the second devices 112-1 and 112-2 and the first device 111. Consequently, the second device 112-2 and the first device 111 may monitor, based on the key information, data associated with communication of the third device 130. In other words, the second device 112-2 and the first device 111 are waiting for communication with the third device 130.

Roaming Operation

In the embodiment where the second device 112-1 is determined as the communication device, when the third device 130 moves from a position A to a position B, the second device 112-1 may determine 211 whether the RSSI value associated with communication of the third device 130 received by the second device 112-1 is below a predetermined threshold (for clarity, hereinafter referred to as fourth threshold). If the RSSI value associated with communication of the third device 130 is below the fourth threshold, the second device 112-1 may trigger a roaming mechanism. In the circumstance, the second device 112-1 may transmit 212 to the first device 111 a request on roaming of the third device 130 (for clarity, hereinafter also referred to as second request). In some embodiments, the second request may include the token and cached data related to the third device 130 stored at the second device 112-1. The cached data are data related to the third device 130 not processed by the second device 112-1.

In response to receiving the roaming request, the first device 111 may select a device from the second devices 112-1 and 112-2 and the first device 111 as a candidate device (for clarity, hereinafter also referred to as first candidate device), for subsequent use in communication with the third device 130. In this example, it is assumed that the second device 112-2 is the candidate device. In some embodiments, the first device 111 may select a device having a RSSI value higher than a predetermined threshold (for clarity, hereinafter also referred to as first threshold) as the first candidate device. In some embodiments, the first device 111 may select a device having the highest RSSI value as the first candidate device. It should be appreciated that the selection of the first candidate device may be implemented in any appropriate manner, and is not limited to the above examples.

Upon determination of the first candidate device, the first device 111 may transmit 214, to the second device 112-2 as the candidate device, the token retrieved from the second device 112-1 and the cached data related to the third device 130 from the second device 112-1. In the condition where each of the first device 111 and the second device 112 in the communication network 110 is in the same working channel, the second device 112-2 may directly communicate with the third device 130 after acquiring the token and the cached data.

In some embodiments, the first device 111 may determine 215 whether the communication device (e.g., the second device 112-1 in this example) and the first candidate (e.g., the second device 112-2 in this example) are in the same working channel. If the first device 111 determines that the communication device and the first candidate device are in different working channels, for example, a first working channel and a second working channel, the first device 111 notifies 216 the second device 112-1 to switch the third device 130 to the second working channel where the first candidate device is located. In some embodiments, the first device 111 may transmit, to the second device 112-1, a Channel Switch Announcement (CSA) message which may include indication information of the second working channel and identification information of the third device 130. Of course, other messages currently known or to be developed in the future are also feasible, and the present disclosure does not limit this aspect.

Upon receipt of the notification, the second device 112-1 may request 217 the third device 130 to switch from the first working channel to the second working channel. For example, the second device 112-1 may transmit an action frame with CSA IE unicast to the third device 130. This is provided only as an example, and any other suitable ways may be employed to request the third device 130 to perform the switch of the working channel.

In response to the request, the third device 130 may switch 218 from the first working channel to the second working channel. Then, the second device 112-2 may directly communicate 219 with the third device 130.

In some embodiments, the second device 112-2 may transmit 220, to the first device 111, an indication on a completion of the roaming of the third device 130 (for clarity, hereinafter also referred to as first indication). In this way, the second device 112-2 can report an event of the completion of the roaming of the third device 130 to the first device 111. Based on the indication, the first device 111 may update 221 the information of the communication device associated with the third device 130. For example, the information of the node with the token may be updated from the first device 112-1 as the second device 112-2, which is shown as below. Hence, the roaming operation of the third device 130 from the second device 112-1 to the second device 112-2 is done.

TABLE 1

Example of token related information

| Device identifier | Information on node with token | Key information | Token expiring time |
|---|---|---|---|
| MAC address of third device 130 | Identifier of second device 112-2 | GTK data PTK data | X seconds |

Load Balance Operation

In some embodiments, the second device 112-1 may determine 222 whether a load of the second device 112-1 exceeds a predetermined threshold (for clarity, hereinafter also referred to as fifth threshold). When the load of the second device 112-1 exceeds the fifth threshold, the second device 112-1 may trigger a load balance mechanism. In this case, the second device 112-1 may transmit 223 a load balance request (for clarity, hereinafter also referred to as third request) to the first device 111. In some embodiments, the third request may include the token and the cached data related to the third device 130 stored at the second device 112-1. The cached data are data related to the third device 130 not processed by the second device 112-1.

In response to receiving the load balance request, the first device 111 may select 224 a device from the second devices 112-1 and 112-2 and the first device 111 as the candidate device (for clarity, hereinafter also referred to as second candidate device), for subsequent use in communication with the third device 130. In this example, it is assumed that the second device 112-2 is the candidate device. In some embodiments, the first device 111 may select a device having a RSSI value higher than a predetermined RSSI value (for clarity, hereinafter also referred to as second threshold) and a load lower than a predetermined load (for brevity, hereinafter also referred to as third threshold) as the second candidate device. In some alternative embodiments, the first device 111 may select a device having the highest RSSI value as the second candidate device. In some alternative embodiments, the first device 111 may select a device having the lowest load as the second candidate device. It should be appreciated that the selection of the second candidate device may be implemented in any appropriate manner and is not limited to the above examples.

Upon determination of the second candidate device, the first device 111 may transmit 225, to the second device 112-2 as the candidate device, the token retrieved from the second device 112-1 and the cached data from the second device 112-1. In the condition that each of the first device 111 and the second device 112 in the communication network 110 are in the same working channel, the second device 112-2 may directly communicate with the third device 130 after acquiring the token and the cached data.

In some embodiments, the first device 111 may determine 226 whether the communication device (e.g., the second device 112-1 in this example) and a second candidate device (e.g., the second device 112-2 in this example) are in the same working channel. If the first device 111 determines that the communication device and the second candidate device are in different working channels, for example, the first working channel and the second working channel, the first device 111 notifies 227 the second device 112-1 to switch the third device 130 to the second working channel where the second candidate device is located. In some embodiments, the first device 111 may transmit, to the second device 112-1, a CSA message which may include indication information of the second working channel and the identification information of the third device 130. Of course, other messages currently known or to be developed in the future are also feasible, and the present disclosure does not limit this aspect.

Upon receipt of the notification, the second device 112-1 may request 228 the third device 130 to switch from the first working channel to the second working channel. For example, the second device 112-1 may transmit an action frame with CSA IE unicast to the third device 130. This is provided merely as an example, and any other suitable ways may also be employed to request the third device 130 to perform the switch of the working channel.

In response to the request, the third device 130 may switch 229 from the first working channel to the second working channel. Then, the second device 112-2 may directly communicate 230 with the third device 130.

In some embodiments, the second device 112-2 may transmit 231 to the first device 111 an indication on a completion of the load balance of the third device 130 (for clarity, hereinafter also referred to as second indication). In this way, the second device 112-2 can report an event of the completion of the load balance of the third device 130 to the first device 111. Based on the indication, the first device 111 may update 232 the information of the communication device associated with the third device 130. For example, the information of the node with the token in Table 1 may be updated from the first device 112-1 as the second device 112-2, which is shown as below. In this way, the load balance operation of the third device 130 from the second device 112-1 to the second device 112-2 is done.

TABLE 1

Example of token related information

| Device identifier | Information on node with token | Key information | Token expiring time |
|---|---|---|---|
| MAC address of third device 130 | Identifier of second device 112-2 | GTK data PTK data | X seconds |

In some embodiments, in response to updating the token related information stored locally, the first device 111 may update a Forwarding Database Table (FBT) to indicate that the third device 130 acquires the Internet service via a new AP node.

Disconnection Operation

In some embodiments, for example, when turning off Wi-Fi, the third device 130 may transmit 233 a disconnection request to the second device (e.g., the second device 112-1) currently providing the communication service for the third device 130. In some embodiments, the third device 130 may transmit a de-authentication frame to the second device 112-1. In some embodiments, the third device 130 may transmit a de-association frame to the second device 112-1.

In response to receiving a disconnection request from the third device 130, the second device 112-1 may delete 234 the key information associated with the third device 130 from the second device 112-1. As such, disconnection from the third device 130 is implemented. In some embodiments, the second device 112-1 may transmit 235 a request for disconnecting from the third device 130 (for clarity, hereinafter also referred to as the third request) to the first device 111. In other words, the second device 112-1 may report, to the first device 111, the request for disconnecting from the third device 130.

In response to receiving the third request, the first device 111 may delete 236 key information associated with the third device 130 stored locally. For example, the key information associated with the third device 130 is deleted from the Table 1, which is shown as below.

TABLE 1

Example of token related information

| Device identifier | Information on node with token | Key information | Token expiring time |
|---|---|---|---|
| MAC address of third device 130 | Identifier of second device 112-1 | NO | X seconds |

In some embodiments, the first device 111 may transmit 237, to the second device 112-2, an indication for deleting the key information associated with the third device 130. Based on the indication, the second device 112-1 may delete the key information associated with the third device 130. The second device 112-2 cancels monitoring on the communication of the third device 130 accordingly.

Token Expiring Operation

In some embodiments, if the communication network 110 fails to detect a signal of the third device 130 within a period of time, it is determined that the token of the third device 130 expires, and a token expiring operation may be triggered accordingly. For example, the current communication device (i.e., the AP node with the token) is the second device 112-1. In some embodiments, the second device 112-1 may determine 239 whether a signal from the third device 130 is detected within a period of time or not. In some embodiments, if determining that no signal from the third device 130 is detected within the period of time, the second device 112-1 may transmit 240 to the first device 111 an indication indicating an expiration of a token associated with the third device 130 (for clarity, hereinafter also referred to as third indication).

Based on the third indication, the first device 111 may retrieve the token from the second device 112-1 and delete 241 communication information associated with the third device 130 stored at the first device 111. For example, the first device 111 may delete an entry associated with the third device 130 from Table 1, as shown below.

TABLE 1

Example of token related information

| Device identifier | Information on node with token | Key information | Token expiring time |
|---|---|---|---|
| ~~MAC address of third device 130~~ | ~~Identifier of second device 112-1~~ | ~~No~~ | ~~X seconds~~ |

Simulation Result

Simulation has been performed for various security modes. Table 2 below shows an example of simulation results of latency.

TABLE 2

Example of simulation results of latency under various security modes

| Security mode | Connection procedure | Latency |
|---|---|---|
| Open | Authentication + Association | 5 ms |
| WPA + PSK | Authentication + Association + Four-way handshake | 80 ms |
| WPA2 + PSK | Authentication + Association + Four-way handshake | 80 ms |
| WPA + 802.1X | Authentication + Association + 802.1X + Four-way handshake | 230 ms |
| WPA2 + 802.1X | Authentication + Association + 802.1X + Four-way handshake | 230 ms |
| 802.11R | Authentication + Re-association | 50 ms |
| Roaming operation in the same working channel according to embodiments of the present disclosure | Roaming information exchange in backhaul | 1 ms |
| Load balance operation in the same working channel according to embodiments of the present disclosure | Load balance information exchange in backhaul | 1 ms |
| Roaming operation in different working channels according to embodiments of the present disclosure | Roaming information exchange in backhaul + channel switch of the third device | 3 ms |
| Load balance operation in different working channels according to embodiments of the present disclosure | Load balance information exchange in backhaul + channel switch of the third device | 3 ms |

As can be seen from the above, compared with the legacy solution, the solution according to the embodiments of the present disclosure can reduce the latency significantly.

So far, the example communication process in the communication network according to embodiments of the present disclosure has been described. It should be appreciated that the process may further include more additional steps or omit some steps shown, and is not limited to the example of FIG. 2. Correspondingly, embodiments of the present disclosure further provide methods implemented at a first device as a root node in the communication network, a second device as an extended node in the communication network, and a third device for communication via the communication network. Reference now will be made to FIGS. 3-6 for description in detail.

Figure 3:
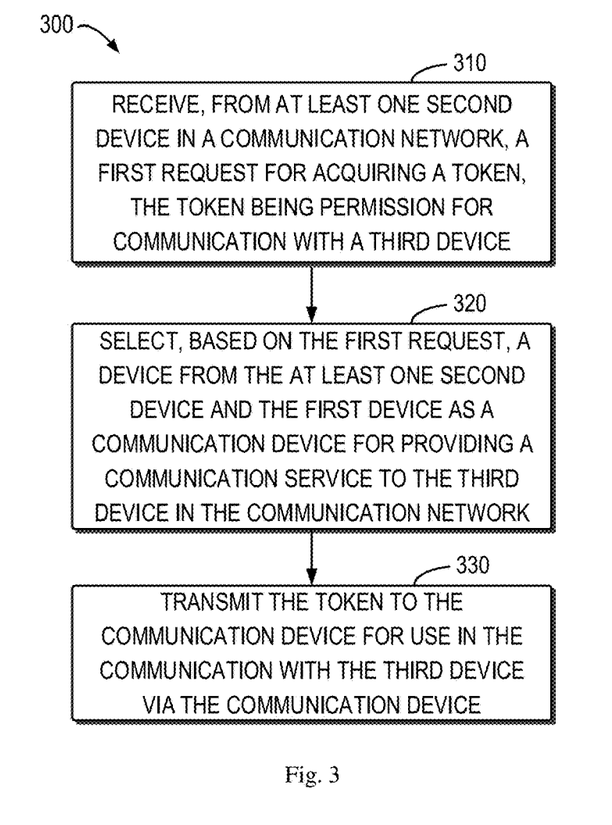
FIG. 3 is a flowchart of a communication method implemented at a first device in a communication network according to an embodiment of the present disclosure.

FIG. 3 is a flowchart of a communication method 300 implemented at a first device in a communication network according to an embodiment of the present disclosure. The method 300, for example, can be implemented at the first device 111 as a root node shown in FIG. 1. For convenience, description will be provided with reference to the example of FIG. 1.

As shown in FIG. 3, at block 310, the first device 111 receives, from at least one second device 112 in the communication network 110, a first request for acquiring a token, the token being permission for communication with the third device 130.

At block 320, the first device 111 selects, based on the first request, a device from the at least one second device 112 and the first device 111 as a communication device for providing a communication service to the third device 130. In some embodiments, the first device 111 may select the device by the following operations: determining whether information of the communication device associated with the third device 130 is stored at the first device 111; if determining that the information of the communication device associated with the third device 130 is stored at the first device 111, determining the communication device from the information of the communication device; and if determining that the information of the communication device associated with the third device 130 is not stored at the first device 111, determining, based on a predetermined strategy, a device from the at least one device 112 and the first device 111 as the communication device. In some embodiments, the predetermined strategy may be based on at least one of a RSSI value or a load.

At block 330, the first device 111 transmits the token to the communication device for communication with the third device 130 via the communication device.

In some embodiments, the third device 111 and the at least one second device 112 have the same SSID, BSSID and AID during the communication with the third device 130. In some embodiments, during the communication with the third device 130, the first device 111 and the at least one second device 112 may also have at least one of: the same basic service set color, or the same timestamp.

In some embodiments, the first device 111 may store the information of the communication device and the token in association with the third device 130.

In some embodiments, the first device 111 may receive, from the communication device, key information associated with communication of the third device 130; and transmit the key information to a device other than the communication device among the at least one second device 112 and the first device 111. In some embodiments, the first device 111 may update, based on the key information received, the key information associated with the third device 130 stored at the first device.

In some embodiments, the first device 111 may receive, from the communication device, a second request on roaming of the third device 130, the second request comprising cached data related to the third device 130 at the communication device; select one device from the at least one second device 112 and the first device 111 as a first candidate device, the first candidate device having a RSSI value higher than a first threshold; and transmit the token and the cached data to the first candidate device.

In some embodiments, in response to determining that the communication device and the first candidate device are in the first working channel and the second working channel, respectively, the first device 111 may notify the communication device to switch the third device 130 to the second working channel.

In some embodiments, the first device 111 may receive, from the first candidate device, a first indication on a completion of the roaming of the third device 130; and update, based on the first indication and with information of the first candidate device, the information of the communication device associated with the third device 130 stored at the first device 111.

In some embodiments, the first device 111 may receive a third request on load balance of the third device 130 from the communication device, the third request comprising cached data related to the third device 130 at the communication device; select a device from the at least one second device 112 and the first device 111 as a second candidate device, the second candidate device has a RSSI value higher than a second threshold and a load lower than a third threshold; and transmit the token and the cached data to the second candidate device.

In some embodiments, in response to determining that the communication device and the second candidate device are in the first working channel and the second working channel, respectively, the first device 111 may notify the communication device to switch the third device 130 to the second working channel.

In some embodiments, the first device 111 may receive a second indication on a completion of the load balance of the third device 130 from the second candidate device, and update, based on the second indication and with the information of the second candidate device, the information of the second device associated with the third device 130 stored at the first device 111.

In some embodiments, the first device 111 may receive from the communication device a third request for disconnecting from the third device 130; delete, based on the third request, the key information associated with the third device 130 stored at the first device 111; and transmit an indication for deleting the key information to a device other than the communication device among the at least one device 112 and the first device 111.

In some embodiments, the first device 111 may receive a third indication on token expiration of the third device 130; and delete, based on the third indication, the communication information associated with the third device 130 stored at the first device 111.

In some embodiments, the first device 111 may be a router as the root node in the communication network 110, the second device 112 may be a router as the extended node in the communication network 110, and the third device 130 may be a terminal device. In some embodiments, the communication device 110 may be one of ESS and MBSS. Rather than limited to the above type, the communication network 110 may be any other appropriate network currently known or to be developed in the future.

Figure 4:
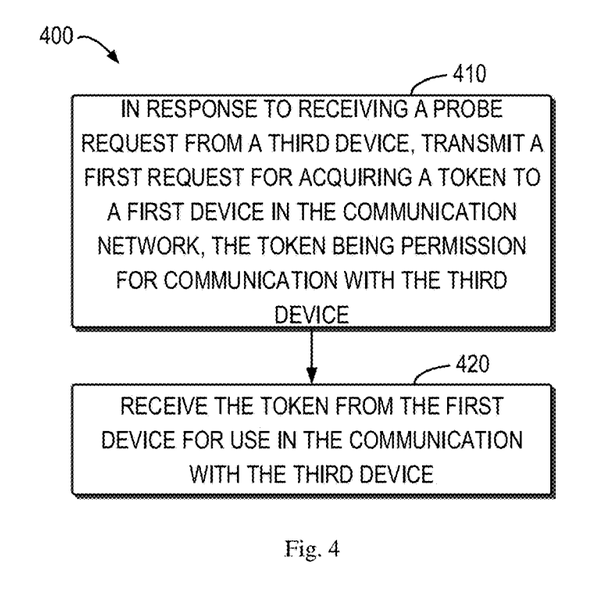
FIG. 4 is a flowchart of a communication method implemented at a second device in a communication network according to an embodiment of the present disclosure.

FIG. 4 is a flowchart of a method 400 implemented at a second device in a communication network according to an embodiment of the present disclosure. The method 400, for example, may be implemented at any of the second devices 112-1 and 112-2 as shown in FIG. 1. For convenience, description will be provided using the implementation at the second device 112-1 as an example. Reference now will be made to the example of FIG. 1 for description below.

As shown in FIG. 4, at block 410, in response to receiving a probe request from the third device 130, the second device 112-1 transmits a first request for acquiring a token to the first device 111 in the communication network, the token being permission for communication with the third device 130.

At block 420, the second device 112-1 receives the token from the first device 111 for communication with the third device 130. In some embodiments, the first device 111 and the at least one second device 112 have the same SSID, BSSID and AID during the communication with the third device 130. In some embodiments, during the communication with the third device 130, the first device 111 and the at least one second device 112 may also have at least one of: the same basic service set color, or the same timestamp.

In some embodiments, in response to receiving the token, the second device 112-1 may transmit a response to the probe request to the third device 130. In some embodiments, the second device 112-1 may transmit key information associated with communication of the third device 130 to the first device 111.

In some embodiments, in response to the third device 130 being moved from the first position to the second position and the RSSI value of the third device 130 being lower than the fourth threshold, the second device 112-1 may transmit to the first device 111 a second request on roaming of the third device 130, the second request comprising the token and cached data related to the third device at the second device 112-1. In some embodiments, the second device 112-1 may receive, from the first device 111, a notification indicating a switch of the third device 130 from the first working channel to the second working channel; and request, in response to the notification, the third device 130 to switch to the second work channel.

In some embodiments, in response to the load of the second device 112-1 exceeding the fifth threshold, the second device 112-1 may transmit a third request on load balance of the third device 130 to the first device 111, the third request comprising the token and cached data related to the third device 130 at the second device 112-1. In some embodiments, the second device 112-1 may receive, from the first device 111, a notification indicating a switch of the third device 130 from the first working channel to the second working channel; and request, in response to the notification, the third device 130 to switch to the second working channel.

In some embodiments, in response to receiving from the third device 130 a request for disconnection, the second device 112-1 may delete the key information associated with the third device 130; and transmit to the first device 111 a third request for disconnecting from the third device 130.

In some embodiments, the second device 112-1 may transmit to the first device 111 an indication indicating an expiration of the token of the third device 130.

In some embodiments, the first device 111 may be a router as the root node in the communication network 110, the second device 112 may be a router as the extended node in the communication network 110, and the third device 130 may be a terminal device. In some embodiments, the communication device 110 may be one of ESS and MBSS. Rather than limited to the above type, the communication network 110 may be any other appropriate network currently known or to be developed in the future.

Figure 5:
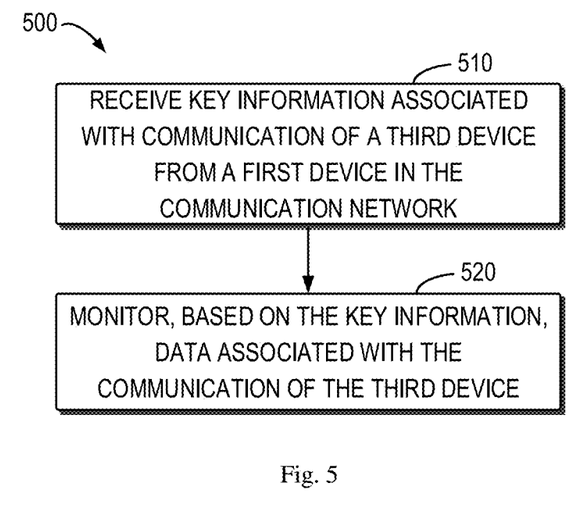
FIG. 5 is a flowchart of a communication method implemented at a second device in a communication network according to another embodiment of the present disclosure.

FIG. 5 is a flowchart of a method 500 implemented at a second device in a communication network according to another embodiment of the present disclosure. The method 500, for example, may be implemented at any of the second devices 112-1 and 112-2 as shown in FIG. 1. For convenience, description will be provided using the implementation at the second device 112-1 as an example. Reference now will be made to the example of FIG. 1 for description below.

As shown in FIG. 5, at block 510, the second device 112-2 receives, from the communication network 110, key information associated with the third device 130 at the first device 111.

At block 520, the second device 112-2 monitors, based on the key information, data associated with communication of the third device 130.

In some embodiments, the first device 111 and the at least one second device 112 have the same SSID, BSSID and AID during communication with the third device 130. In some embodiments, during the communication with the third device 130, the first device 111 and the at least one second device 112 may also have at least one of: the same basic service set color, or the same timestamp.

In some embodiments, in response to receiving a probe request from the third device 130, the second device 112-2 may further transmit a first request for acquiring a token to the first device 111, the token being permission for communication with the third device 130.

In some embodiments, the second device 112-2 may receive, from the first device 111, a token associated with the communication of the third device 130 and cached data related to the third device 130 at the second device 112-2; and perform communication of the third device 130 based on the token and the cached data. In some embodiments, the second device 112-2 may perform the communication of the third device 130 by the following: in response to the third device 130 being switched from the first working channel to the second working channel, performing the communication of the third device 130.

In some embodiments, the second device 112-2 may transmit a first indication on a completion of the roaming of the third device 130 to the first device 111. In some embodiments, the second device 112-2 may transmit a second indication on load balance completion of the third device 130 to the first device 111. In some embodiments, the second device 112-2 may receive from the first device 111 an indication for deleting key information; and delete the key information based on the indication.

In some embodiments, the first device 111 may be a router as the root node in the communication network 110, the second device 112 may be a router as the extended node in the communication network 110, and the third device 130 may be the terminal device. In some embodiments, the communication device 110 may be one of ESS and MBSS. Rather than limited to the above type, the communication network 110 may be any other appropriate network currently known or to be developed in the future.

Figure 6:
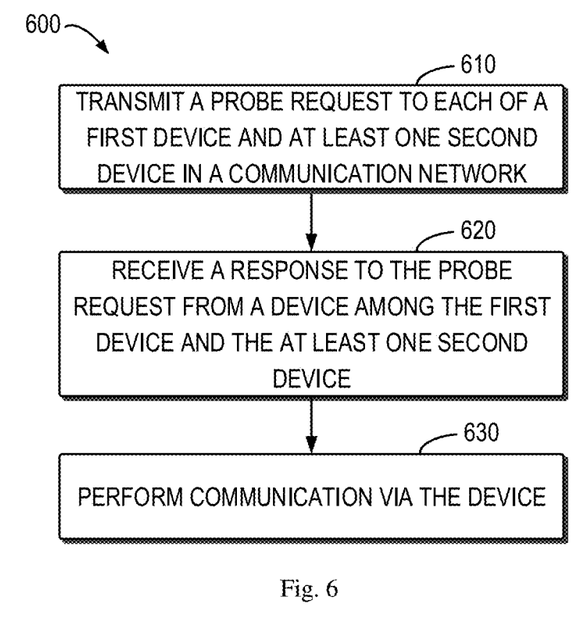
FIG. 6 is a flowchart of a communication method implemented at a third device according to an embodiment of the present disclosure.

FIG. 6 is a flowchart of a method 600 implemented at a third device according to an embodiment of the present disclosure. The method 600, for example, may be implemented at the third device 130 as shown in FIG. 1. For convenience, reference now will be made to the example of FIG. 1 for description below.

As shown in FIG. 6, at block 610, the third device 130 transmits a probe request to each of the first device 111 and the at least one device 112 in the communication network 110. In the embodiment of the present disclosure, the first device 111 and the at least one second device 112 have the same SSID, BSSID and AID during communication with the third device 130. In some embodiments, during the communication with the third device 130, the first device 111 and the at least one second device 112 may also have at least one of the same basic service set color or the same timestamp.

At block 620, the third device 130 may receive a response to the probe request from a device among the first device 110 and the at least one device 112.

At block 630, the third device 130 performs communication via the device.

In some embodiments, the third device 130 may further receive, via a dedicated message from the device, an indication indicating a switch from the first working channel to the second working channel; and perform, based on the indication, the switch from the first working channel to the second working channel.

In some embodiments, the third device 130 may transmit a request for disconnection to the device.

In some embodiments, the first device 111 may be a router as the root node in the communication network 110, the second device 112 may be a router as the extended node in the communication network 110, and the third device 130 may be a terminal device. In some embodiments, the communication device 110 may be one of ESS and MBSS. Rather than limited to the above type, the communication network 110 may be any other appropriate network currently known or to be developed in the future.

The communication method in a communication network according to embodiments of the present disclosure has been described above. Other details correspond to the corresponding description with reference to FIG. 2 and thus are not repeated here. According to the method according to embodiments of the present disclosure, by means of collaboration of a plurality of AP nodes, a terminal device can be safely and seamlessly connected to any AP node without re-establishing the connection. In this way, communication security of the terminal device can be improved and service latency of the terminal device can be significantly reduced. In addition, a good compatibility with most terminal devices can be attained.

Corresponding to the methods above, there are further provided apparatuses in the embodiments of the present disclosure. The apparatus capable of performing the method 300 may include respective means for performing the respective steps of the method 300. Those means may be implemented in any appropriate manner, for example, circuitry or software modules. In some embodiments, the apparatus may be implemented at a root node (e.g., the first device 111 in FIG. 1) in the communication network.

In some embodiments, the apparatus may include: means for receiving, at the first device 111 in the communication network 110 and from the at least one second device 112 in the communication network 110, a first request for acquiring a token, the token being permission for communication with the third device 130, each of the first device 111 and the at least one second device 112 having the same SSID, BSSID and AID during communication with the third device 130; means for selecting, based on the first request, a device from the at least one second device 112 and the first device 111 as a communication device for providing a communication service to the third device 130; and means for transmitting the token to the communication device for communication with the third device 130 via the communication device.

The apparatus capable of performing the method 400 may include respective means for performing respective steps of the method 400. Those means may be implemented in any appropriate manner, for example, circuitry or software modules. In some embodiments, the apparatus may be implemented at an extended node (e.g., any of the second devices 112-1 and 112-2, where the second device 112-1 is taken as an example here) in the communication network.

In some embodiments, the apparatus may include: means for transmitting, at the second device 112-1 in the communication network 110, a first request for acquiring a token to the first devices 111 in the communication network 110 in response to receiving a probe request from the third device 130, the token being permission for communication with the third device 130, and the first device 111 and the at least one second device 112 having the same SSID, BSSID and AID during communication with the third device 130; and means for receiving the token for communication with the third device 130.

The apparatus capable of performing the method 500 may include respective means for performing respective steps of the method 500. Those means may be implemented in any appropriate manner, for example, circuitry or software modules. In some embodiments, the apparatus may be implemented at an extended node (e.g., any of the second devices 112-1 and 112-2, where the second device 112-1 is taken as an example here) in the communication network.

In some embodiments, the apparatus may include: means for receiving, at the second device 112-2 in the communication network 110, key information associated with communication of the third device 130 from the first device 111 in the communication network 110, the first device 111 and the at least one second device 112 having the same SSID, BSSID and AID during communication with the third device 130; and means for monitoring, based on the key information, data associated with the communication of the third device 130.

The apparatus capable of performing the method 600 may include respective means for performing respective steps of the method 600. Those means may be implemented in any appropriate manner, for example, circuitry or software modules. In some embodiments, the apparatus may be implemented at a third device (e.g., the third device 130) in the communication network.

In some embodiments, the apparatus may include: means for transmitting, at the third device 130, a probe request to each of the first device 111 and the at least one second device 120 in the communication network, each of the first device 111 and the at least one second device 112 having the same SSID, BSSID and AID during communication with the third device 130; means for receiving a response to the probe request from a device among the first device 111 and the at least one second device 112; and means for performing communication via the device.

Figure 7:
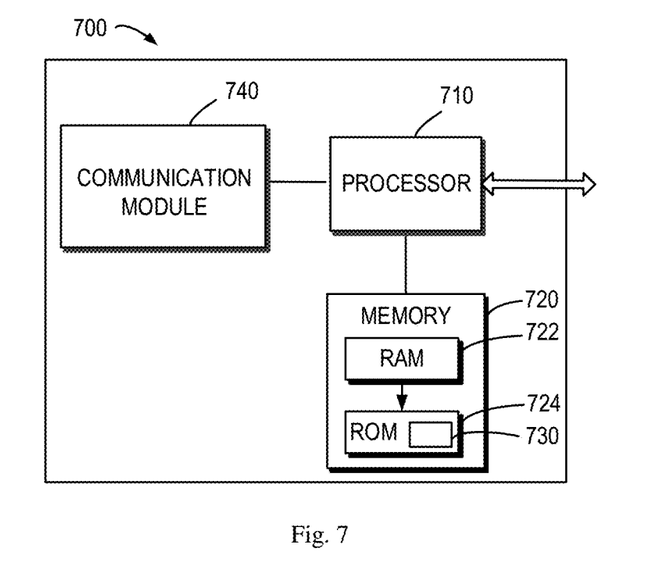
FIG. 7 is a schematic structure block diagram of a device according to an embodiment of the present disclosure.

FIG. 7 is a simplified block diagram of a device 700 according to embodiments of the present disclosure. The device 700 may be provided to implement a communication device, for example, the first device 111, a second device 112-1, a second device 112-2 or a third device 130 as shown in FIG. 1. As shown, the device 700 includes one or more processors 710, one or more memories 720 coupled to the processor 710, and one or more communication modules 740 coupled to the processor(s) 710.

The communication module 740 is provided for bidirectional communication. A communication interface can represent any interface necessary for communication with other network component.

The processor 710 may be of any type suitable for a local technical network, and may include, for example, without limitation, one or more of the following: a general computer, dedicated computer, microprocessor, Digital Signal Processor (DSP), and a multicore processor architecture-based processor. The device 700 may include a plurality of processors, for example, a dedicated integrated circuit chip which is chronically subordinated to a clock synchronous with the main processor.

The memory 720 may include one or more nonvolatile memories and one or more volatile memories. The example of the nonvolatile memory includes, but is not limited to, a Read-Only Memory (ROM) 724, Electrically Programmable Read-Only Memory (EPROM), flash memory, disk, Compact Disk (CD), Digital Video Disk (DVD), and other magnetic and/or optical storage device. The example of the volatile memory includes, but is not limited to, a Random Access Memory (RAM) 722 and other volatile memories that do not function during power off.

The computer program 730 includes computer executable instructions executed by an associated computer 710. The program 730 may be stored in the ROM 720. The processor 710 may execute any appropriate actions and processing by loading the program 730 into the RAM 720.

The embodiments of the present disclosure can be implemented by means of the program 730 such that the device 700 can execute any processing of the present disclosure as discussed above with reference to FIGS. 2-6. The embodiments of the present disclosure can also be implemented by hardware or a combination of hardware and software.

Figure 8:
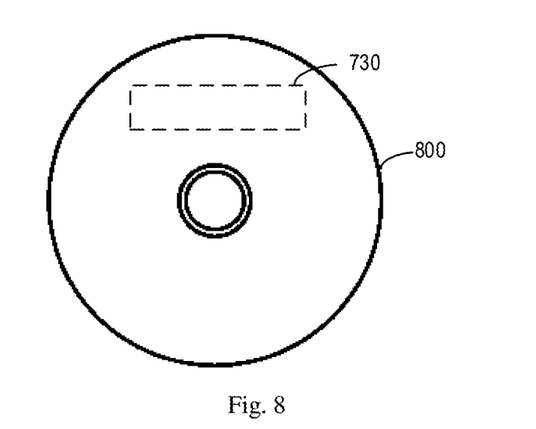
FIG. 8 is a schematic diagram of a computer readable storage medium according to an embodiment of the present disclosure.

In some embodiments, the program 730 may be tangibly included in a computer readable medium which, in turn, may be included in the device 700 (e.g., the memory 720) or other memory devices accessible by the device 700. The program 730 can be loaded from the computer readable medium to the RAM 722 for execution. The computer readable medium may include any type of tangible nonvolatile memory, for example, ROM, EPROM, flash, disk, CD, DVD, and the like. FIG. 8 is an example of a computer readable medium 800 in the form of CD or DVD. The computer readable medium stores thereon a program 730.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof. Illustrative types of hardware logic components that can be used to implement embodiments of the present disclosure include but are not limited to Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

As examples, embodiments of the present disclosure may be described in the context of the computer-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, a computer program code or related data can be carried by any appropriate carrier, to enable an apparatus, device or processor to execute various processing and operations as described above. The example of carrier includes a signal, computer readable medium, and the like.

The example of the signal may include a signal transmitted in an electrical, optical, radio, sound, or other form, such as a carrier, infrared signal, and the like.

A machine readable medium may be any tangible medium that may contain, or store a program for use by or in connection with an instruction execution system, apparatus, or device. The computer readable medium may be a machine readable signal medium or a machine readable storage medium. The computer readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain cases, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it should be appreciated that the present disclosure defined in the appended claims is not necessarily limited to the specific features or acts described above. Rather, the specific features and acts described above are disclosed as example forms of implementing the claims.

What is claimed is:

1. A first device in a communication network, comprising:
a processor; and
a memory coupled to the processor and having instructions stored therein, the instructions when executed by the processor causing the first device to,
receive, from at least one second device in the communication network, a first request for acquiring a token, the token being permission for communication with a third device, the first device and the at least one second device having a same service set identifier (SSID), basic service set identifier (BSSID), and associated identifier (AID) during the communication with the third device;
select, based on the first request, a device from the at least one second device and the first device as a communication device for providing a communication service to the third device in the communication network; and
transmit the token to the communication device for use in the communication with the third device via the communication device.

2. The first device of claim 1, wherein during the communication with the third device, the first device and the at least second device further have at least one of the following: a same basic service set color, or a same timestamp.

3. The first device of claim 1, wherein the first device is caused to select the communication device by:
determining whether information of the communication device is stored at the first device;
in accordance with a determination that the information of the communication device is stored at the first device, determining the communication device from the information of the communication device; and
in accordance with a determination that the information of the communication device is not stored at the first device, determining, based on a strategy, the communication device from the at least one second device and the first device.

4. The first device of claim 1, wherein the first device is further caused to:
store, in association with the third device, information of the communication device and the token.

5. The first device of claim 1, wherein the first device is further caused to:
receive, from the communication device, a second request on roaming of the third device, the second request comprising cached data related to the third device at the communication device;
select a device from the at least one second device and the first device as a first candidate device, the first candidate device having a received signal strength indicator value higher than a first threshold; and
transmit the token and the cached data to the first candidate device.

6. The first device of claim 1, wherein the first device is further caused to:
receive, from the communication device, a third request on load balance of the third device, the third request comprising cached data related to the third device at the communication device;
select, based on the third request, a device from the at least one second device and the first device as a second candidate device, the second candidate device having a received signal strength indicator value higher than a second threshold, and a load lower than a third threshold; and
transmit the token and the cached data to the second candidate device.

7. The first device of claim 1, wherein the first device is a router as a root node in the communication network, the second device is a router as an extended node in the communication network, and the third device is a terminal device, and
wherein the communication network is one of an extended service set (ESS) network and a mesh basic service set (MBSS) network.

8. A second device in a communication network, comprising:
a processor; and
a memory coupled to the processor and having instructions stored therein, the indications when executed by the processor causing the second device to,
in response to receiving a probe request from a third device, transmit a first request for acquiring a token to a first device in the communication network, the token being permission for communication with the third device, the first device and the at least one second device having a same service set identifier (SSID), basic service set identifier (BSSID), and associated identifier (AID) during the communication with the third device; and
receive the token from the first device for use in the communication with the third device.

9. A second device in a communication network, comprising:
a processor; and
a memory coupled to the processor and having instructions stored therein, the instructions when executed by the processor causing the second device to,
receive, from a first device in the communication network, key information associated with communication of a third device, the first device and the at least one second device having a same service set identifier (SSID), basic service set identifier (BSSID), and associated identifier (AID) during communication with the third device; and
monitor, based on the key information, data associated with the communication of the third device.

10. A third device, comprising:
a processor; and
a memory coupled to the processor and having instructions stored therein, the instructions when executed by the processor causing the third device to,
transmit a probe request to each of a first device and at least one second device in a communication network, each of the first device and the at least one second device having a same service set identifier (SSID), basic service set identifier (BSSID), and associated identifier (AID) during communication with the third device;
receive a response to the probe request from a device among the first device and the at least one second device; and
perform communication via the device.

* * * * *